Jan. 1, 1935. P. W. DEMPSEY 1,986,465
GASKET CONSTRUCTION
Filed Dec. 20, 1933
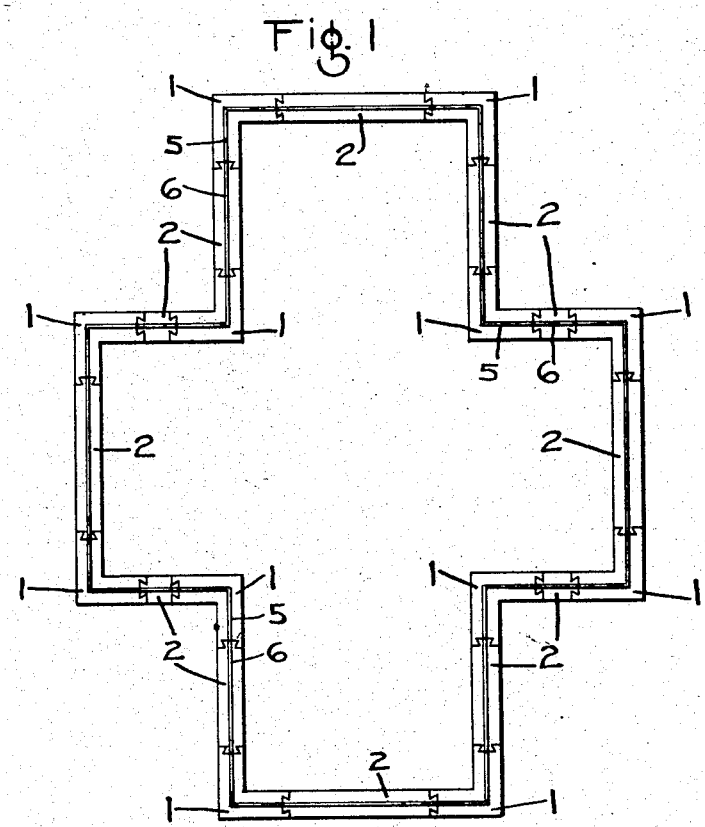
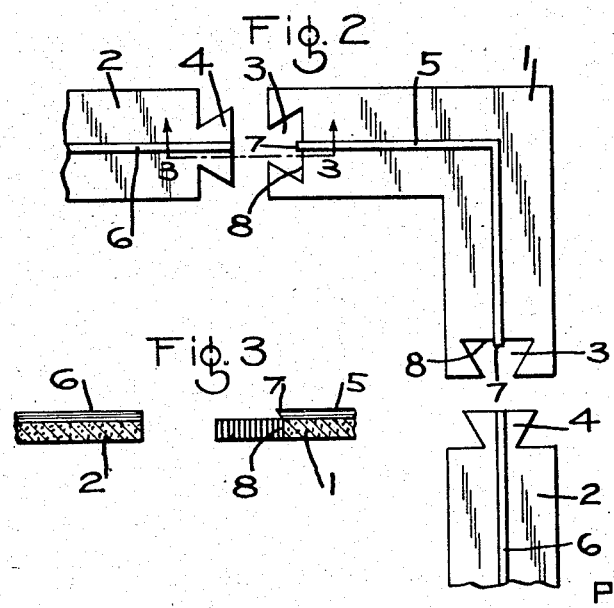
INVENTOR.
PHILIP W. DEMPSEY
BY Wm. M. Cady
ATTORNEY.

Patented Jan. 1, 1935

1,986,465

UNITED STATES PATENT OFFICE 1,986,465

GASKET CONSTRUCTION

Philip W. Dempsey, Pittsburgh, Pa., assignor to The Westinghouse Air Brake Company, Wilmerding, Pa., a corporation of Pennsylvania Application December 20, 1933, Serial No. 703,235

6 Claims. (Cl. 288—1)

The invention relates to gaskets and more particularly to the type employed for effecting a leak-proof joint or seal between two members.

In order to obtain a leak-proof seal between two members, it is customary to interpose a thin and narrow gasket of relatively soft or deformable material, such as rubber, which is deformed so as to press tightly against said members as they are secured to each other. Further, it is well known that the narrower a gasket is, the more readily a leak-proof seal is obtained, and in order to take advantage of this fact, a gasket, such as above described, is often provided on one side with a narrow raised bead which, under pressure, provides the desired narrow sealing surface, the main body portion of the gasket acting mainly, in such a construction, as a means for carrying and positioning the bead which otherwise might be difficult to handle and position.

Gaskets of the above type are readily manufactured and handled up to certain sizes, over which, it is impractical to make them in a single piece. For instance in oil transformers, it is very desirable to use a gasket of the above construction between the oil reservoir portion and the reservoir cover, but some of these transformers require such a gasket over fifty feet in length and it is not practicable to either manufacture or handle such a large gasket.

One object of the invention is to provide an improved gasket of the above type for use in large transformers or the like.

Another object of the invention is to provide an improved gasket which is built up in sections.

Another feature of the invention resides in the process by which the sectional gaskets are made.

In the accompanying drawing; Fig. 1 is a plan view of a flat, strip-like gasket embodying the invention; Fig. 2 is an enlarged view of certain parts of the gasket; and Fig. 3 is a sectional view on the line 3—3 of Fig. 2.

According to one form of my invention, as illustrated in Fig. 1, the gasket comprises contour changing or corner pieces 1 and filler strips 2 arranged and connected to the corner pieces 1 by dovetail joints, in the manner shown in the drawing. It will be obvious that the form of the corner pieces 1 and the length of the filler strips 2 may be different from the particular gasket shown in the drawing, to provide various contours and sizes of gasket as required in different cases.

Referring to Fig. 2 it will be noted that each of the corner pieces 1 is provided on each end with a dovetail mortise 3, and each of the filler strips 2 is provided on each end with a dovetail tenon 4 which, when fitted into the mortise 3 in the corner pieces 1, provides an interlocking joint between the corner piece 1 and filler strips 2.

The corner pieces 1 are provided centrally, on one of the sealing faces, with a raised sealing bead 5 and the filler strips 2 are provided with a similar bead 6. In each corner piece 1, the bead 5 is provided with a tapered portion 7 which extends from the junction of the bead with the inner edge 8 of the mortise 3, outwardly over the mortise, while on each filler strip 2, the end of the bead 6 is flush with the outer edge of the tenon 4. This extension 7 of bead 5 is adapted to slightly overlap the bead 6 on the filler strip and thereby ensure a perfect seal at the joint formed by the butting of the ends of the beads 5 and 6 when a corner piece 1 and filler strip 2 are locked together and under compression.

It will be evident that by selecting the proper length of filler strips 2 and connecting them to the corner pieces 1, the desired size and shape of gasket may be obtained.

According to the invention, it is proposed to mold the corner pieces 1, including the mortises 3 and bead 5, to the desired size and form, and to provide the material for the filler strips 2 in rolls of long lengths. Then to build a gasket for a certain device, the corner pieces are first positioned on the device. With a hand punch, the tenon 4 is cut in one end of the filler strip material. The length of the filler strip required to connect two corner pieces is then measured and cut, and a tenon cut in the opposite end of the measured strip. The two corner pieces are then connected by the measured and cut filler strip. This process is followed around the device where it is desired to provide a gasket, which results in a continuous gasket of the desired size and shape for the device.

Due to the interlocking of the joints and the overlapping of the beads on the corner pieces onto the beads on the filler strips, this gasket will not pull apart while being applied and will provide an effective seal, the gasket in all ways being the equivalent of a solid one piece gasket.

While one illustrative embodiment of the invention has been described in detail, it is not my intention to limit its scope to that embodiment or otherwise than by the terms of the appended claims.

Having now described my invention, what I claim as new and desire to secure by Letters Patent, is:

1. A gasket comprising a plurality of spaced contour changing pieces and filler strips connected with the free ends of said pieces, the connected ends of said pieces and strips being adapted to interlock.

2. A gasket comprising a plurality of spaced contour changing pieces and filler strips connected with the free ends of said pieces, the connected ends of said pieces and strips being adapted to provide mortise and tenon joints between said pieces and strips.

3. A gasket comprising a plurality of spaced contour changing pieces and filler strips connected with the free ends of said pieces, the connected ends of said pieces and strips being adapted to provide dovetail joints between said pieces and strips.

4. A gasket comprising a plurality of spaced contour changing pieces, filler strips connected with the free ends of said pieces, the connected ends of said pieces and strips being adapted to provide mortise and tenon joints between said pieces and strips, a raised bead on the sealing face of said contour changing pieces, and a raised bead on said filler strips butting the bead on the connected contour changing pieces.

5. A gasket comprising a plurality of spaced contour changing pieces, filler strips connected with the free ends of said pieces, the connected ends of said pieces and strips being adapted to provide mortise and tenon joints between said pieces and strips, a raised bead on the sealing face of said contour changing pieces, and a raised bead on said filler strips butting and overlapping the bead on the connected contour changing pieces.

6. A gasket comprising a plurality of spaced contour changing pieces, filler strips connected with the free ends of said pieces, a mortise in the free ends of said contour changing pieces, a tenon on the ends of said filler pieces interlocking with said mortise forming a joint, a raised bead on the sealing face of said filler strips extending flush with the end of said tenons, and a raised bead on said contour changing pieces extending over the inner edge of said mortises and adapted to engage the bead on the adjacent filler strip.

PHILIP W. DEMPSEY.